(12) United States Patent
Boe

(10) Patent No.: US 6,377,447 B1
(45) Date of Patent: Apr. 23, 2002

(54) QUICK RELEASE DISK DRIVE TO CHASSIS MOUNTING APPARATUS AND METHOD

(75) Inventor: Craig Boe, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/398,316

(22) Filed: Sep. 16, 1999

(51) Int. Cl.⁷ ................................................. G06F 1/16
(52) U.S. Cl. ...................... 361/685; 361/679; 361/683; 361/684; 361/685; 361/686; 361/724; 361/725; 361/829; 312/223.1; 312/223.2; 312/257.1
(58) Field of Search ........................ 361/679, 683–686, 361/724, 725, 829; 312/223.1, 223.2, 257.1

(56) References Cited

U.S. PATENT DOCUMENTS

| | | | |
|---|---|---|---|
| 2,032,017 A | 2/1936 | Hocher et al. ............ 29/155.52 |
| 2,231,153 A | 2/1941 | Camiener ....................... 24/73 |
| 2,311,410 A | 2/1943 | Meyer .......................... 189/88 |
| 2,419,317 A | 4/1947 | Hall ............................. 248/74 |
| 2,443,362 A | 6/1948 | Tinnerman ................... 70/370 |
| 2,590,264 A | 3/1952 | Meyers ........................ 24/213 |
| 2,627,385 A | 2/1953 | Tinnerman ................... 248/27 |
| 2,659,950 A | 11/1953 | West .............................. 24/73 |
| 2,703,662 A | 3/1955 | Meyer ........................ 220/3.6 |
| 2,868,486 A | 1/1959 | Poupitch ..................... 248/68 |
| 3,154,281 A | 10/1964 | Frank ......................... 248/201 |
| 3,258,033 A | 6/1966 | Ohnstad ..................... 138/176 |
| 3,345,029 A | 10/1967 | Palmer ....................... 248/300 |
| 3,368,780 A | 2/1968 | Buttriss ........................ 248/27 |
| 3,532,311 A | 10/1970 | Havener ....................... 248/62 |
| 3,606,223 A | 9/1971 | Havener ..................... 248/205 |
| 3,612,749 A | 10/1971 | Grube, Jr. et al. ....... 174/138 G |
| 3,613,177 A | 10/1971 | Davis et al. ................ 24/73 B |
| 3,681,593 A | 8/1972 | Genovese et al. .... 240/51.11 R |
| 3,909,908 A | 10/1975 | Brefka ........................ 29/417 |
| 3,932,016 A | 1/1976 | Ammenheuser ............. 339/65 |
| 3,963,204 A | 6/1976 | Liss ......................... 248/27 R |
| 3,993,272 A | 11/1976 | Linderman .................... 248/73 |
| 4,126,923 A | 11/1978 | Cislak ......................... 29/416 |
| 4,362,284 A | 12/1982 | Bolante .................. 248/205 R |
| 4,383,716 A | 5/1983 | Osborn ..................... 310/37 R |
| 4,577,818 A | 3/1986 | Clarisse ..................... 248/27.3 |
| 4,745,524 A | 5/1988 | Patton, III .................. 361/399 |
| 4,756,495 A | 7/1988 | Putnam ..................... 248/27.3 |
| 4,786,121 A | 11/1988 | Lyons ......................... 312/214 |
| 4,874,977 A | 10/1989 | Safranek ..................... 310/269 |
| 4,878,153 A | 10/1989 | Loris .......................... 361/394 |
| 4,881,315 A | 11/1989 | Powell et al. ................. 29/450 |
| 4,906,201 A | 3/1990 | Young et al. ............... 439/108 |
| 4,949,934 A | 8/1990 | Krenz et al. ................ 248/676 |
| 4,998,828 A | 3/1991 | Hobbs ......................... 384/18 |
| 5,015,802 A | 5/1991 | Chi ............................. 174/35 |
| 5,090,097 A | 2/1992 | Koester, Jr. et al. .......... 24/552 |
| 5,100,215 A | 3/1992 | Cooke et al. ............. 312/257.1 |
| 5,193,792 A | 3/1993 | Marco ........................ 269/282 |
| 5,236,157 A | 8/1993 | Reggiani ................... 248/27.1 |
| 5,262,923 A | 11/1993 | Batta et al. ................. 361/685 |
| 5,320,311 A | 6/1994 | Jensen et al. .............. 248/27.1 |
| 5,366,186 A | 11/1994 | Weyeneth .................. 248/27.3 |
| 5,461,541 A | 10/1995 | Wentland, Jr. ............. 361/707 |
| 5,545,843 A | 8/1996 | Arvidsson et al. ...... 174/35 GC |
| 5,587,889 A | 12/1996 | Sacherman ................. 361/809 |
| 5,596,170 A | 1/1997 | Barina et al. ............. 174/35 R |
| 5,599,080 A | 2/1997 | Ho .......................... 312/334.7 |

(List continued on next page.)

Primary Examiner—Leo P. Picard
Assistant Examiner—Yean-Hsi Chang
(74) Attorney, Agent, or Firm—Perkins Coie LLP

(57) ABSTRACT

The invention provides for an apparatus and method for quickly attaching a disk drive to a computer chassis and for quickly removing a disk drive from a computer chassis. The sliding of a slide member that is slidably coupled to a bracket is employed to secure a disk drive in the bracket. Sliding of the slide member in an opposite direction releases the disk drive from the bracket. The bracket is coupled to the computer chassis.

37 Claims, 6 Drawing Sheets

U.S. PATENT DOCUMENTS

| | | | |
|---|---|---|---|
| 5,682,291 A | * 10/1997 | Jeffries et al. | 361/1.85 |
| 5,683,159 A | 11/1997 | Johnson | 312/334.7 |
| 5,731,955 A | 3/1998 | Bartanen et al. | 361/704 |
| 5,757,618 A | 5/1998 | Lee | 361/686 |
| 5,768,099 A | 6/1998 | Radloff et al. | 361/685 |
| 5,788,211 A | 8/1998 | Astier | 248/674 |
| 5,806,949 A | 9/1998 | Johnson | 312/334.7 |
| 5,828,547 A | 10/1998 | Francovich et al. | 361/685 |
| 5,921,644 A | * 7/1999 | Brunel et al. | 312/223.2 |
| 6,049,963 A | 4/2000 | Boe | 29/525.01 |

* cited by examiner

QUICK RELEASE DISK DRIVE TO CHASSIS MOUNTING APPARATUS AND METHOD

TECHNICAL FIELD

The present invention is directed toward an apparatus and method for securing a disk drive to a computer chassis.

BACKGROUND OF THE INVENTION

A conventional mounting device for a disk drive such as a hard disk drive, floppy disk drive, or CD-ROM drive in a computer chassis includes a drive cage or, more generically, a bracket. The bracket provides a means of connection to the disk drive as well as a means of connection to the chassis. A typical arrangement is to employ screws to connect a disk drive to the bracket. The bracket is in turn connected to the chassis by screws or the like, or may be made from a portion of common material with the chassis. The primary disadvantage of conventional devices is that screws must be used to connect the disk drive to the chassis. Insertion and removal of screws is time consuming and cumbersome due to the workspace restrictions and accessibility limitations existing within a typical chassis. Consequently, it is difficult to quickly remove a disk drive from a conventional mounting device, or to quickly install a disk drive in a conventional mounting device.

Another goal of a disk drive mounting device is to provide a low profile bracket that consumes as little volume as possible within a computer chassis. A bracket that accepts a drive in sliding engagement is adept in this regard since the profile of the bracket may be only slightly larger than the outer dimension of the disk drive held in the bracket. This is in contrast to a mechanism that operates by opening about a hinge or pivoting about a point to accept or capture a disk drive. A significant drawback of conventional devices is that the devices do not provide for sliding engagement directly between a disk drive and the bracket. Conventional devices instead include a special jacket that mounts to the disk drive with conventional screws. These conventional mounting devices, therefore, do not avoid the use of screws. The jacket carrying the disk drive in turn slides to engage with the bracket of the mounting device. Although the disk drive and jacket may be easily slid into and out of the chassis, the jacket must still be removed from the disk drive before the disk drive may be serviced or replaced. In a manufacturing setting, the jacket adds another part to be supplied and assembled, and the means of connecting the jacket to a disk drive is through the slow and inefficient use of conventional screws.

The prior art fails to provide a low profile disk drive mounting device that may be assembled without screws or other conventional fasteners and the requisite tools to deploy the fasteners. An improved apparatus would not require the use of screws or other conventional fasteners. An improved apparatus would, consequently, not only be easier to operate, but would also enable quick operation. An improved apparatus would provide a low profile bracket that did not require larger than necessary volume within the computer chassis. Additionally, an improved apparatus would provide a secure connection between a disk drive and a computer chassis.

SUMMARY OF THE INVENTION

One embodiment of the invention is an apparatus for mounting a disk drive to a chassis where the apparatus has a bracket with a deformable element for engaging the disk drive. The apparatus also has a slide member slidably coupled to the bracket. The slide member has a surface for forcing the deformable element against the disk drive to secure the disk drive in the bracket. In an embodiment of the invention, the deformable element includes a tongue with a connecting end. The tongue is coupled to the bracket at the connecting end of the tongue.

Another embodiment of the invention is an apparatus for mounting a disk drive to a chassis with a bracket for supporting the disk drive in a first direction. Additionally, there is a slide member slidably coupled to the bracket such that sliding the slide member in a second direction substantially perpendicular to the first direction supports the disk drive in the second direction and in a third direction opposite the second direction. By sliding the slide member in the third direction, the disk drive is released in the second direction and in the third direction.

Another embodiment of the invention is an apparatus for mounting a disk drive to a chassis with a bracket for supporting the disk drive in a first direction. The apparatus also has a slide member slidably coupled to the bracket such that sliding of the slide member in a second direction substantially perpendicular to the first direction causes the disk drive to be fixed in the bracket. Sliding of the slide member in a third direction opposite the second direction releases the fixed attachment of the disk drive from the bracket.

Yet another embodiment of the invention is a computer system having an apparatus for mounting a disk drive where the system has a chassis having a front, a bezel coupled to the front of the chassis, a power supply coupled to the chassis, a central processing unit coupled to the chassis and electrically connected to the power supply, and a disk drive electrically connected to the central processing unit. The disk drive may have an apparatus for mounting the disk drive to the chassis. The apparatus includes a bracket coupled to the chassis. The bracket may have a deformable element for engaging the disk drive. The apparatus may also have a slide member slidably coupled to the bracket. The slide member may have a surface for forcing the deformable element against a side of the disk drive to secure the disk drive in the bracket.

Still another embodiment of the invention is a method of mounting a disk drive to a chassis comprising the acts of: inserting a disk drive into a bracket that is coupled to a chassis; and sliding a slide member to force a deformable element of the bracket against the disk drive to secure the disk drive in the bracket.

Another embodiment of the invention is a method of removing a disk drive from a chassis comprising the acts of: sliding a slide member to release a portion of the bracket from contact with the disk drive; and removing the disk drive from the chassis

DETAILED DESCRIPTION OF THE INVENTION

Figure 1:
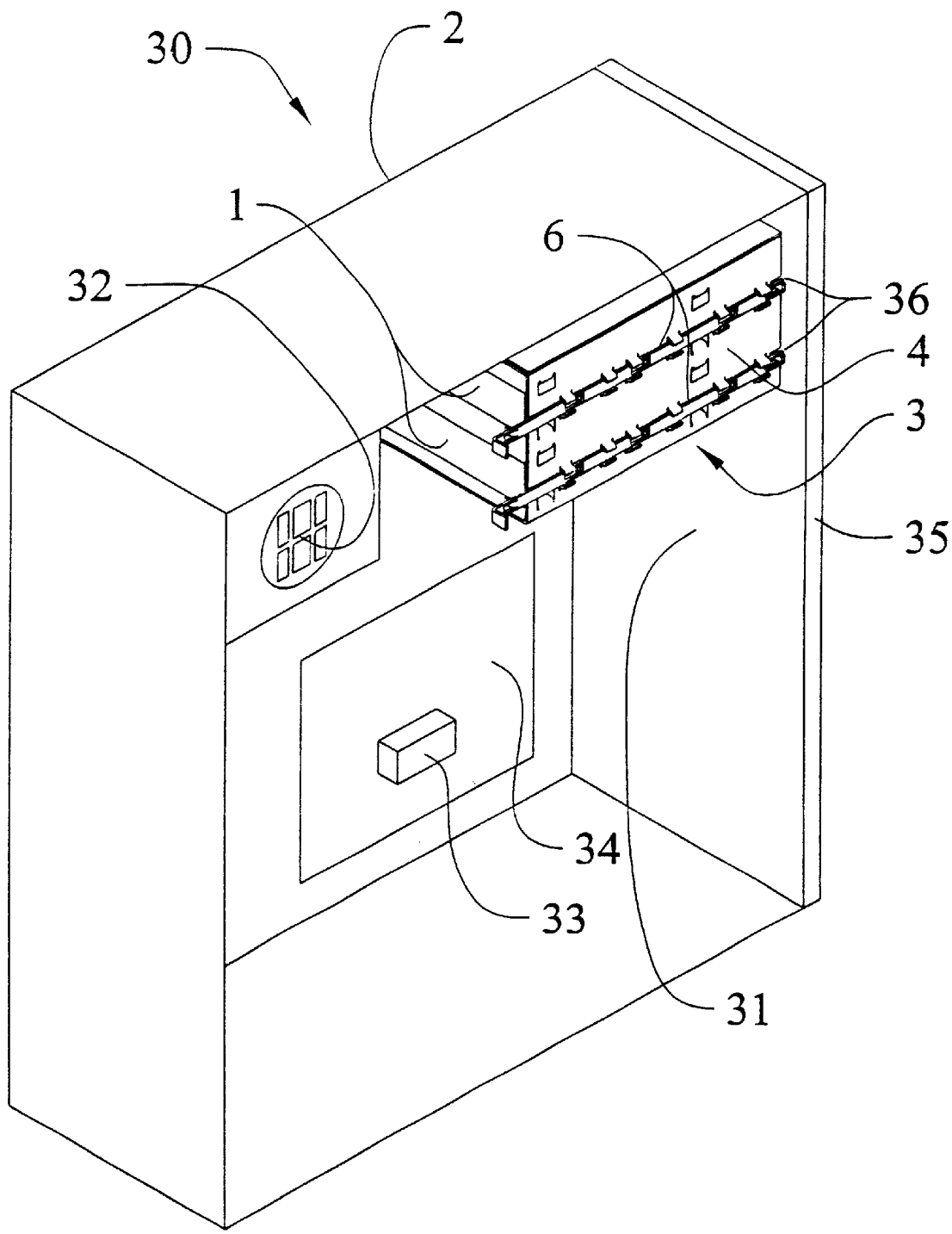
FIG. 1 is a perspective view of an embodiment of the mounting apparatus mounted in a computer system.

Embodiments of the present invention are directed toward an apparatus 3 for mounting a disk drive 1 to a chassis 2, as shown in FIG. 1. The apparatus 3 may have a bracket 4 in which the disk drive 1 can be secured.

Description of an Embodiment of the Invention

Figure 2:
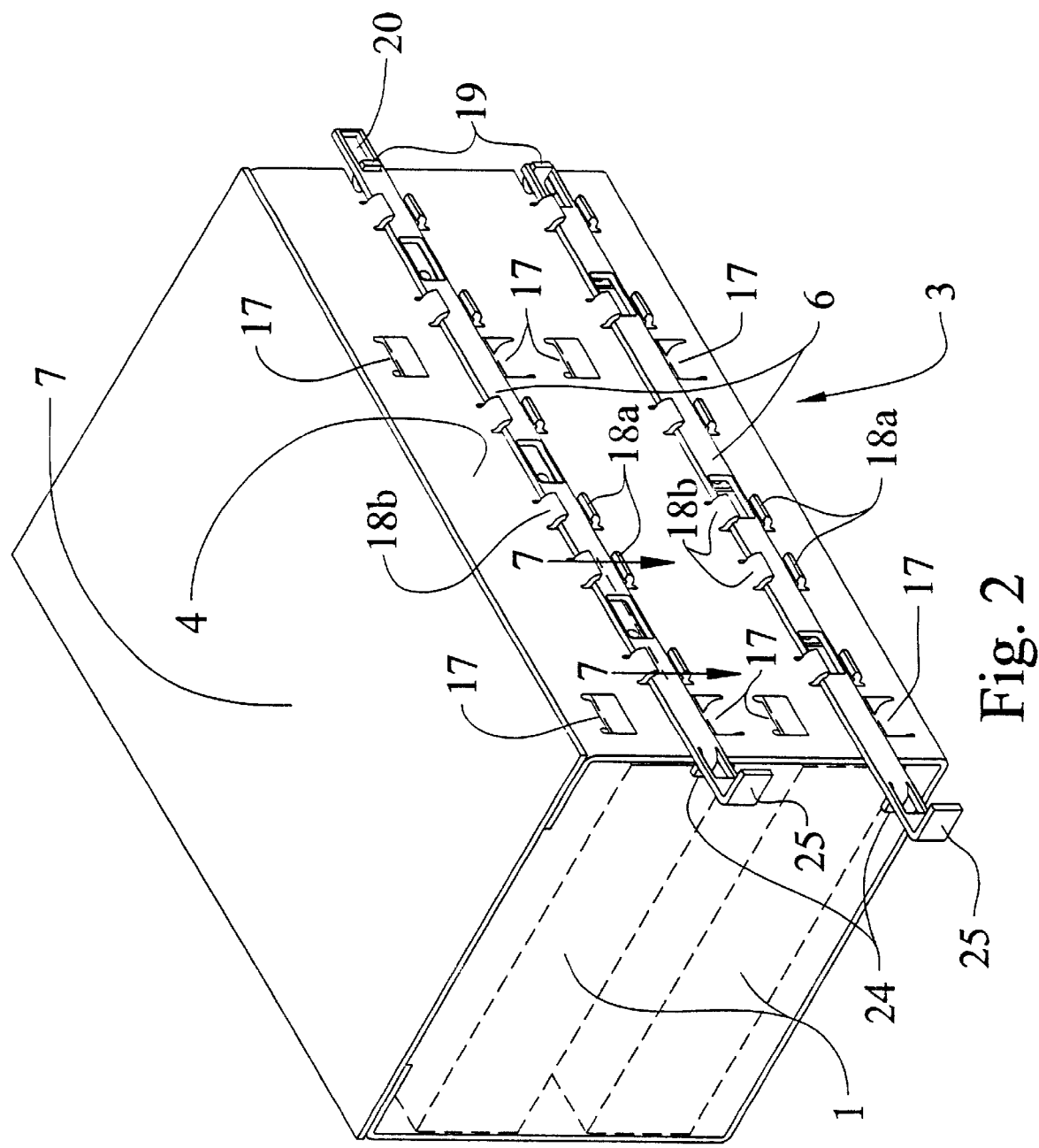
FIG. 2 is a perspective view of an embodiment of the mounting apparatus.
Figure 8A:
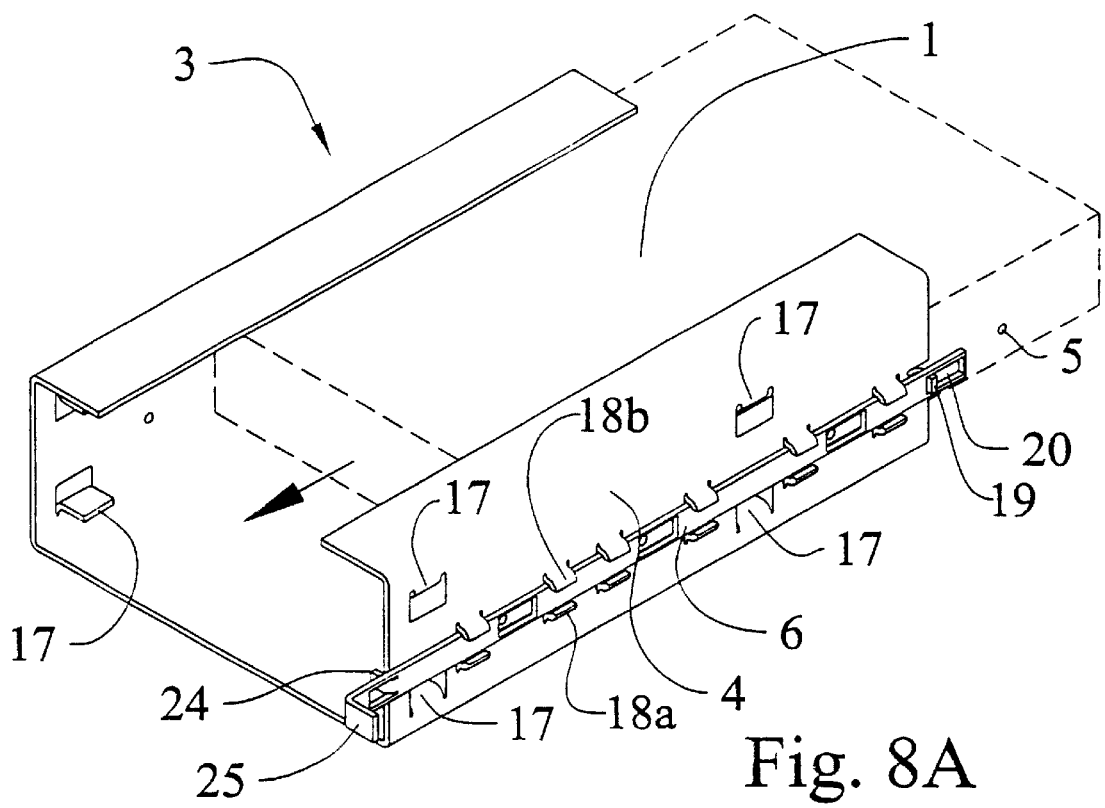
FIG. 8A is a perspective view of an embodiment of the invention illustrating a disk drive being inserted into the mounting apparatus.

FIG. 2 shows an enlarged view of the apparatus for mounting a disk drive illustrated in FIG. 1. FIG. 2 shows two disk drives 1 in a bracket 4. Embodiments of the invention may have one, two, or more disk drives in a single bracket. The disk drive 1 may be a hard disk drive, a floppy disk drive, a CD-ROM disk drive, a DVD disk drive, a tape drive, or any other related type of drive. The type or even the inclusion of a disk drive as an element is not a limitation of the invention. The disk drive is illustrated merely to more clearly show the configuration and operation of the apparatus. A typical disk drive has an elongated generally cubical outer dimension. A conventional disk drive has standardized threaded holes in the sides of the disk drive for receiving threaded fasteners such as screws. FIG. 8A shows a hole 5 in a side of the disk drive 1. A conventional disk drive may have three such holes on one side of the disk drive and three matching holes on the opposite side of the disk drive. The apparatus also has a slide member 6 slidably coupled to the bracket 4. In embodiments of the invention, sliding the slide member 6 forces a deformable element of the bracket 4 against the disk drive 1 to secure the disk drive in the bracket. Details of the deformable element are described below.

Bracket

Figure 3:
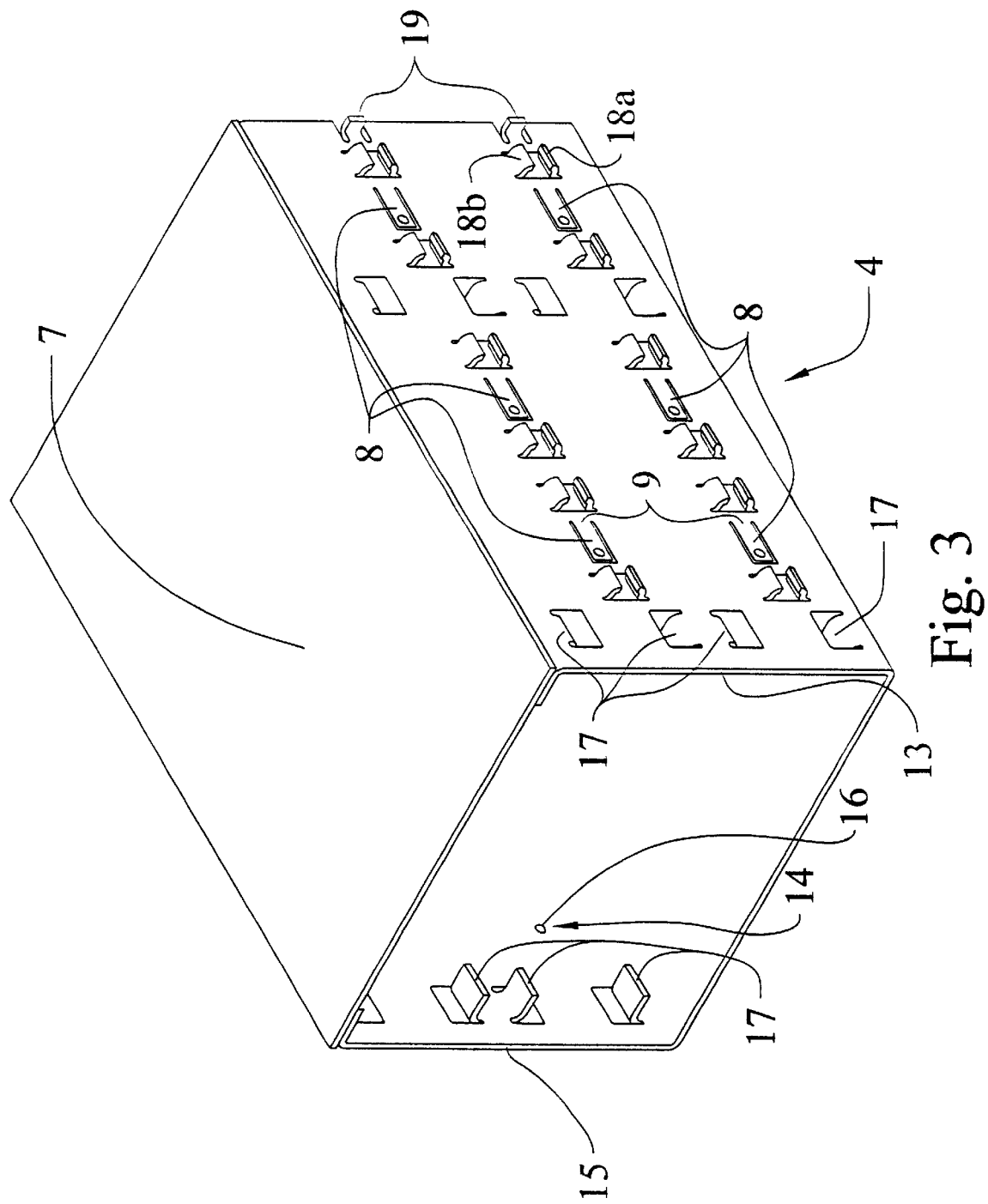
FIG. 3 is a perspective view of an embodiment of the mounting apparatus as shown in FIG. 2 but with the slide members removed for clarity of other components
Figure 4:
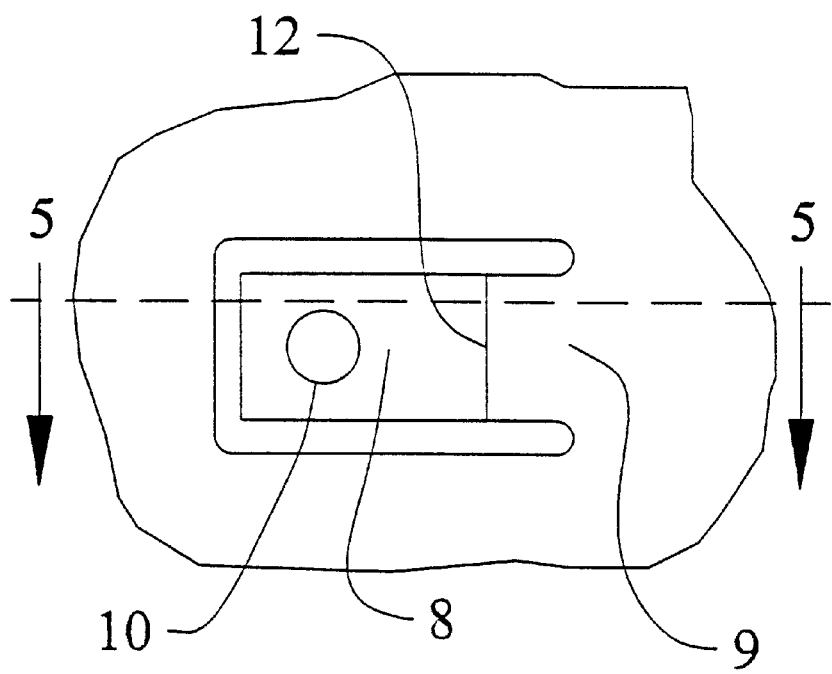
FIG. 4 is a side elevation view of a portion of the mounting apparatus shown in FIG. 3.
Figure 5:
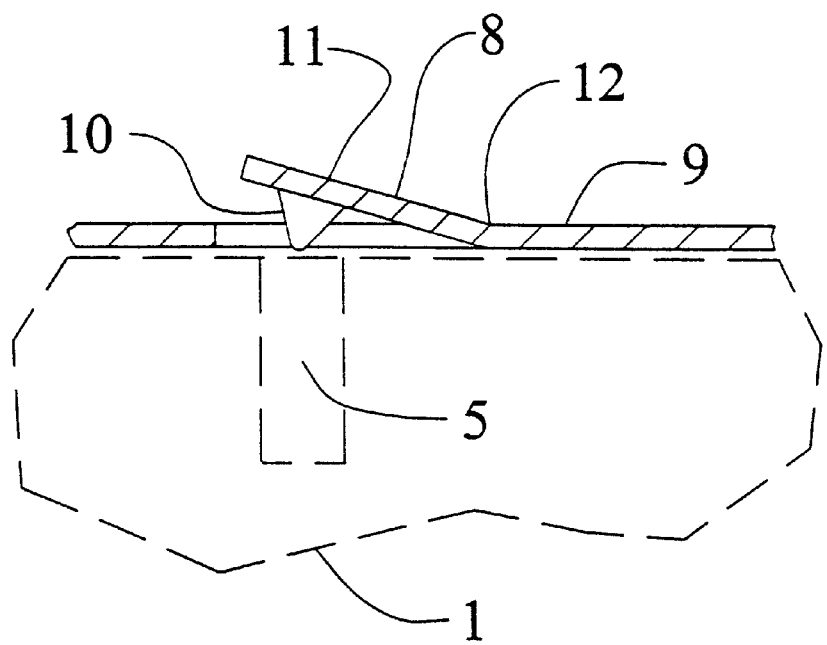
FIG. 5 is a cross section view through line 5—5 as shown in FIG. 4.
Figure 8B:
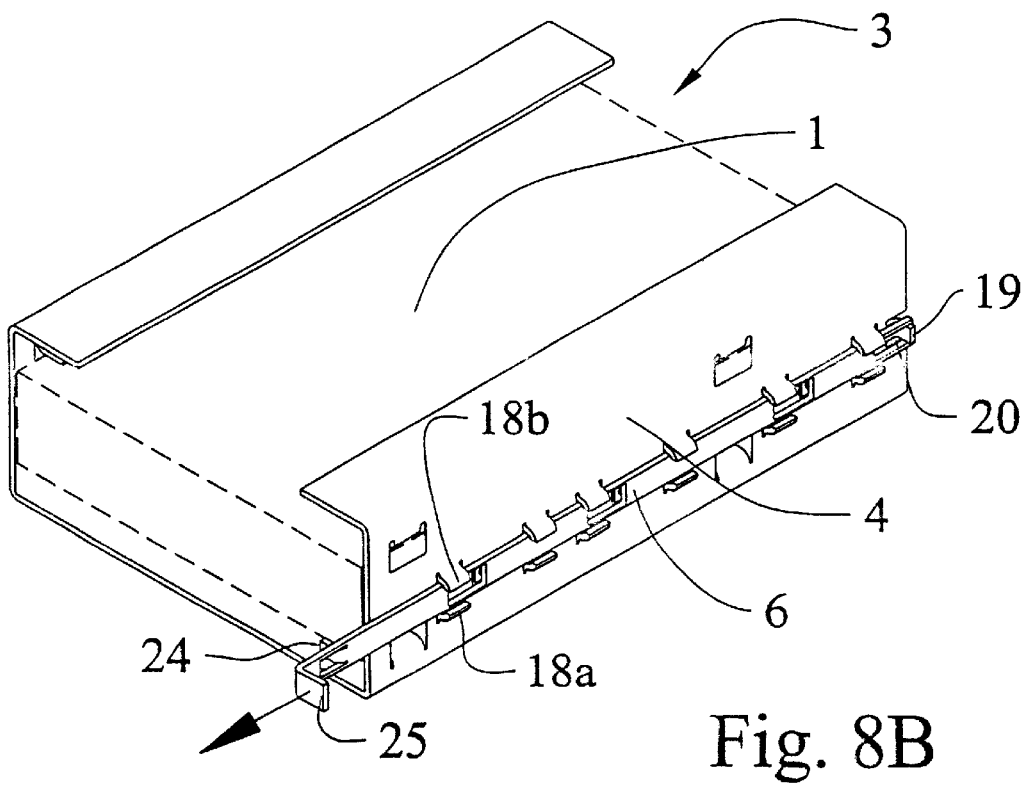
FIG. 8B is a perspective view of the embodiment of the invention shown in FIG. 8A illustrating the disk drive in a mounted position and the slide member having been slid to engage with the disk drive in the mounting apparatus.

In some embodiments, the bracket 4 may be made from a ferrous metal such as a sheet steel. Many types of material would be adequate for forming the bracket. The bracket 4 may include a cap 7, as shown in FIGS. 2 and 3, or may be formed from a single piece of material and include no cap, as shown in FIGS. 8A and 8B. As illustrated in FIGS. 3–5, the bracket 4 has a deformable element that includes a tongue 8. Other types of deformable elements other than the tongue shape would perform equally well in other embodiments of the invention.

As illustrated, the tongue 8 has a connecting end 9. The tongue 8 is coupled to the bracket 4 at the connecting end 9. As shown in FIG. 3, the tongue 8 is part of the first side 13 of the bracket 4. The tongue 8 may also have a first protrusion 10 facing the interior of the bracket 4 as best seen in FIG. 5. The first protrusion 10 is for engaging with the disk drive 1 to secure the disk drive. The protrusion 10 may be formed by plastically deforming a portion of the tongue 8 in the direction of the protrusion. In some embodiments of the invention, the protrusion 10 is forced into a hole in the disk drive when engaging the disk drive 1. Such a hole 5 is illustrated in FIG. 8A. In other embodiments, the first protrusion 10 could be forced against the side of the disk drive to engage and secure the disk drive 1. Similarly, a portion of the tongue 8 facing the interior of the bracket 4 may be made from an elastomer. By forcing the tongue 8 against the side of the disk drive, the portion of the tongue made from an elastomer engages and secures the disk drive 1. The portion of the tongue made from an elastomer could be a piece of elastomer fixed to the side of the main body 11 of the tongue in a manner similar to the orientation of the first protrusion 10 shown in FIG. 5. In addition, the portion of the tongue made from an elastomer could be a jacket that fits over the main body 11. As shown in FIGS. 4 and 5, the main body 11 of the tongue 8 has a bend 12 that biases the first protrusion 10 away from the hole 5 unless the tongue is acted upon by another force.

As shown in FIG. 3, the bracket 4 includes a fastener 14 on the second side of the bracket. The second side 15 is opposite from the first side 13 of the bracket. Similar to the tongue 8, the fastener 14 is for engaging the disk drive to secure the disk drive. The fastener 14 may engage the disk drive 1 with a second protrusion 16 similar to the first protrusion 10. The second protrusion 16 extends into the interior of the bracket to engage the disk drive 1. A portion of the fastener 14 may include a section made from an elastomer for engaging and securing the disk drive. In some embodiments of the invention, the disk drive 1 may be secured between the tongue 8 and a fastener 14, the tongue and the fastener being on opposite sides of the disk drive.

As shown in FIGS. 2, 3, 8A, and 8B, the bracket 4 may include a support tab 17 extending from a side of the bracket. The support tab 17 is for holding the disk drive 1 to prevent movement of the disk drive substantially parallel with the side of the bracket from which the support tab extends. As illustrated, the support tab 17 is formed from a portion of the bracket that is bent out substantially perpendicularly from the bracket. Support tabs 17 may be placed below the disk drive to support the bottom side of the disk drive, above the disk drive to support the top side of the disk drive, or both below and above the disk drive to support the bottom and top of the disk drive as is shown in the figures. In some embodiments (not shown), a common support tab could be used to support the top of a first disk drive and the bottom of a second disk drive located above the first disk drive.

In embodiments of the invention, the bracket will include a retention tab for slidably coupling the slide member 6 to the bracket 4. The retention tab may be formed from a portion of the bracket that is bent out from the bracket. As shown in FIGS. 2, 3, 8A, and 8B, sets of two retention tabs 18a and 18b are used to slidably couple the slide member 6 to the bracket 4. Each of the two retention tabs, 18a and 18b, are located on opposite sides of the slide member 6 from one another.

The bracket 4 may also include a front stop 19 for restricting the sliding motion of the slide member 6. The front stop 19 is shown in FIGS. 2, 3, 8A, and 8B. The interaction of the front stop 19 and the slide member 6 will be discussed in more detail below.

Slide Member

Figure 7:
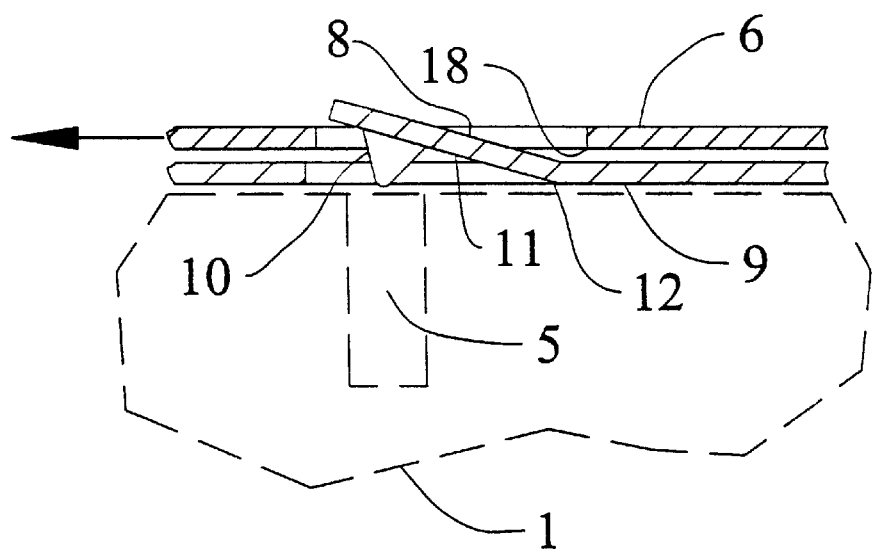
FIG. 7 is a cross section view through line 7—7 as shown in FIG. 2.

The apparatus 3 for mounting a disk drive 1 also includes a slide member 6 as illustrated in FIGS. 2, 8A, and 8B. In some embodiments, the slide member 6 may be made from a ferrous metal such as a sheet steel. Many types of material would be adequate for forming the slide member. The slide member 6 is slidably coupled to the bracket 4. The slide member 6 has a surface for forcing the deformable element against the disk drive 1 to secure the disk drive in the bracket. The deformable element shown is the tongue 8. As illustrated in FIG. 7, the surface is a corner surface 18. As the slide member is slid, the corner surface 18 contacts the tongue 8 and forces the protrusion 10 into engagement with the hole 5 in the disk drive 1. In other embodiments, another surface could provide similar contact.

Figure 6:
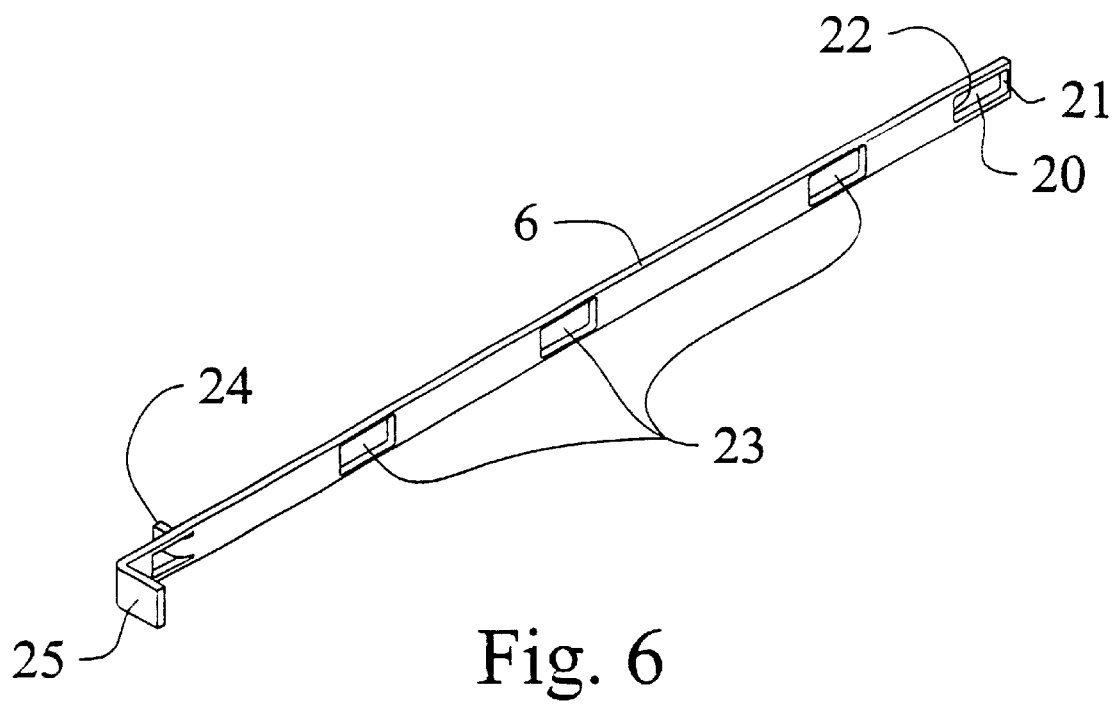
FIG. 6 is a perspective view of a slide member of an embodiment of the invention.

The slide member may also include a front stop slot 20 as illustrated in FIGS. 2, 6, 8A, and 8B. The front stop 19 of the bracket 4 travels in the front stop slot 20. As shown in FIG. 6, the front stop slot 20 has a front end 21 and a back end 22. Contact between the front stop 19 and the front end 21 of the front stop slot 20 restricts the motion of the slide member 6 toward the back end of the slide member. This state is illustrate in the top slide member in FIG. 2 and in FIG. 8A. Contact between the front stop 19 and the back end 22 of the front stop slot 20 restricts motion of the slide member 6 toward the front end of the slide member. This state is illustrated in the bottom slide member in FIG. 2 and in FIG. 8B.

Referring now to FIGS. 6 and 7, the slide member may include an opening 23 into which the tongue 8 extends when the slide member 6 is moved toward the slide member's front end relative to the bracket 4. The tongue 8 is expelled by the corner surface 18 when the slide member 6 is moved toward the slide member's back end. As illustrated, the protrusion 10 of the tongue 8 is engaged with the disk drive 1 when the slide member 6 is move toward the slide member's back end.

As shown in FIGS. 2, 6, 8A, and 8B, the slide member 6 includes a back stop 24. The back stop 24 is located near the back end of the slide member 6, and is for restricting the sliding motion of the slide member. The back stop 24 may be formed from a part of the slide member 6 that is bent out from the main body of the slide member. The back stop 24 and the front stop 19 may not both be needed in certain embodiments of the invention. The invention may have a front stop and a back stop both, may have one and not the other, or may have neither and still be operable. The slide member 6 may also include a handle 25 on the back end of the slide member. The handle 25 is for grasping to move the slide member 6 relative to the bracket 4.

As illustrated in FIGS. 2, 8A, and 8B, an embodiment of the invention includes a bracket 4 for supporting the disk drive 1 in a first direction. The direction as shown is the vertical direction. However, in other embodiments, the first direction might be a direction other than vertical. The invention also includes a slide member 6 slidably coupled to the bracket 4 such that sliding the slide member in a second direction causes support for the disk drive in the second direction as well as support in a third direction. The second direction is substantially perpendicular to the first direction, and the third direction is opposite the second direction. In some embodiments, sliding the slide member 6 in the second direction causes the disk drive to be fixed in the bracket 4. Sliding of the slide member in the third direction cause the disk drive to be released in the second and third directions or to become released from fixed attachment in the bracket. As illustrated in FIG. 2, 8A, and 8B, the support tabs 17 support the disk drives 1 in the first direction as well as in a fourth direction. The fourth direction is opposite the first direction.

Description of Another Embodiment of the Invention

In another embodiment, the invention is a computer system 30 having an apparatus for mounting a disk drive 3. As shown in FIG. 1, the system 30 includes a chassis 2 having a front 31, and the system has a power supply 32 coupled to the chassis. The system 30 also includes a central processing unit 33 coupled to the chassis 2 and electrically connected to the power supply 32. As illustrated in FIG. 1, a portion of the electrical connection between the central processing unit 33 and the power supply 32 is made through a motherboard 34. The chassis 2, power supply 32, central processing unit 33, and motherboard 34 are well known to one skilled in the art and do not require additional description.

The system 30 also includes a disk drive 1 electrically connected to the central processing unit 33. A portion of this electrical connection may be through the motherboard 34. In the present embodiment, the disk drive 1 also includes the apparatus 3 for mounting the disk drive to the chassis 2. The chassis 2 illustrated is a "tower" configuration chassis. However, the invention would work equally well with other computer configurations. The apparatus 3 has a bracket 4 coupled to the chassis 2. The bracket 4 has a deformable element for engaging the disk drive 1. The apparatus 3 also has a slide member 6 slidably coupled to the bracket 4. The slide member has a surface for forcing the deformable element of the bracket 4 against a side of the disk drive to secure the disk drive in the bracket. The bracket 4 and the slide member 6 are substantially identical to the bracket and slide member described in detail in the section above.

The computer system 29 may also include a bezel 35 coupled to the front 31 of the chassis 2. Sliding movement of the slide member 6 is restricted by contact between the front end of the slide member 6 and the bezel 35 when the bezel is coupled to the chassis 35. The restricting areas of contact 36 of the bezel 35 are shown in FIG. 1. By this arrangement, the disk drive 1 remains secured in the bracket 4 so long as the bezel 35 is coupled to the chassis 2. Use of the bezel in this manner creates an additional level of security for attachment of the disk drive to the chassis.

Method of Mounting a Disk Drive

One embodiment of the invention is a method of mounting a disk drive to a chassis. Aspects of the embodiment are illustrated in FIGS. 8A and 8B. The method may be accomplished using the apparatus 3 detailed above. First, the disk drive 1 is inserted into a bracket 4. Such an insertion is illustrated in FIG. 5A. The motion of the disk drive 1 is depicted by the motion arrow in FIG. 8A. In embodiments of the invention, the bracket 4 is coupled to the chassis 2 similar to the coupling shown in FIG. 1. Next the slide member 6 is slid to force a deformable element of the bracket 4 against the disk drive 1 to secure the disk drive in the bracket. FIG. 8B shows the slide member 6 having been slid to secure the disk drive 1. The motion arrow shows the direction of slide of the slide member 6 to secure the disk drive 1. In some embodiments of the method, sliding the slide member to force the deformable element of the bracket against the disk drive includes the act of forcing a tongue against the bracket. The tongue of some embodiments is substantially identical to the tongue 8 describe above and illustrated in FIGS. 3–5. The method may employ a protrusion 10 on the tongue 8 as also described above. The protrusion 10 may be forced into a hole 5 (FIG. 5) in the disk drive 1 when the slide member is slid to the position shown in FIG. 8B.

Method of Removing a Disk Drive

Another embodiment of the invention is a method of removing a disk drive from a chassis. An embodiment of the invention on which this method may be performed is illustrated in FIG. 1. In an embodiment of this method, the first act is to remove a bezel 35 from the chassis 2. The bezel 35 is attached to the chassis 2 and restricts sliding movement of the slide member 6 by contact between the slide member and the bezel when the bezel is coupled to the chassis. Restricting areas of contact 36 of the bezel 35 are illustrated in FIG. 1. After the bezel 35 is removed, the slide member 6 may be slid to release a portion of the bracket 4 from contact with the disk drive 1. The disk drive 1 may then be removed from the chassis 2.

From the foregoing it will be appreciated that, although specific embodiments of the invention have been described for purposes of illustration, various modification may be made without deviating from the spirit and scope of the invention. Accordingly, the invention is not limited except as by the claims.

Advantages of the Invention

An advantage of the present invention is that it provides a disk drive mounting device that may be operated without screws or other conventional fasteners. Consequently, the disk drive may be secured without the use of tools, such as screwdrivers or wrenches, needed to fasten conventional fasteners. Therefore, not only is the invention easier to use in mounting a disk drive, but the invention provides for quicker and easier removal of a disk drive from a computer chassis.

Another advantage of the invention is that is provides for direct connection to standard disk drives. This is in contrast to prior art mounting schemes that require supplemental brackets or special fasteners to provide an interface between a bracket attached to the chassis and a standard disk drive.

Still another advantage of the invention is that it provides for a low profile bracket that does not unnecessarily consume volume within the computer chassis. Embodiments of the invention provide for a bracket that is only slightly larger than the disk drive itself.

Yet another advantage of the invention is that it provides a secure connection between a disk drive and a computer chassis. The connection provided is adequate to provide secure connection under anticipated service loads. Additionally, in some embodiments the bezel connection to the chassis provides an another level of security by not allowing the slide member mechanism to operate unless the bezel is removed from the chassis.

What is claimed is:

1. An apparatus for mounting a disk drive to a chassis, comprising:
   a bracket having a deformable element for engaging the disk drive; and
   a slide member slidably coupled to said bracket to move a first direction relative to the bracket and a second direction opposite the first direction, said slide member having a recess with an edge positioned to engage the deformable element and force the deformable element against the disk drive to secure the disk drive in said bracket when the slide member moves in the first direction, the recess receiving at least part of the deformable element when the slide member moves in the second direction.

2. The apparatus for mounting a disk drive of claim 1 wherein the deformable element includes a tongue with a connecting end, the tongue being coupled to said bracket at the connecting end of the tongue.

3. The apparatus for mounting a disk drive of claim 2 wherein the tongue includes a first protrusion facing the interior of said bracket, the first protrusion being positioned to engage with the disk drive to secure the disk drive.

4. The apparatus for mounting a disk drive of claim 2 wherein the tongue includes a portion facing the interior of said bracket made from an elastomer, the portion being positioned to engage with the disk drive to secure the disk drive.

5. The apparatus for mounting a disk drive of claim 1 wherein said bracket includes a fastener on the side of said bracket opposite from said slide member, the fastener being positioned to engage the disk drive to secure the disk drive.

6. The apparatus for mounting a disk drive of claim 5 wherein the fastener includes a second protrusion extending into the interior of said bracket, the second protrusion being positioned to engage with the disk drive to secure the disk drive.

7. The apparatus for mounting a disk drive of claim 5 wherein the fastener includes a section made from an elastomer, the section being positioned to engage with the disk drive to secure the disk drive.

8. The apparatus for mounting a disk drive of claim 1 wherein said bracket includes a support tab extending from a side of said bracket, the support tab being positioned to hold the disk drive to prevent movement of the disk drive substantially parallel with the side of said bracket from which the support tab extends.

9. The apparatus for mounting a disk drive of claim 8 wherein the support tab is formed from a portion of said bracket, the portion being bent out substantially perpendicularly from said bracket.

10. The apparatus for mounting a disk drive of claim 8 wherein a first support tab is on a bottom side of the disk drive.

11. The apparatus for mounting a disk drive of claim 8 wherein a first support tab is on a top side of the disk drive.

12. The apparatus for mounting a disk drive of claim 8 wherein a first support tab is on a bottom side of the disk drive and a second support tab is on a top side of the disk drive.

13. The apparatus for mounting a disk drive of claim 1 wherein said bracket includes a retention tab for slidably coupling said slide member to said bracket.

14. The apparatus for mounting a disk drive of claim 13 wherein the retention tab is formed from a portion of said bracket that is bent out from said bracket.

15. The apparatus for mounting a disk drive of claim 1 wherein said bracket includes two retention tabs, each of the two retention tabs being located on opposite sides of said slide member from one another, the two retention tabs being positioned to slidably couple said slide member to said bracket.

16. The apparatus for mounting a disk drive of claim 1 wherein said bracket includes a front stop positioned to restrict the sliding motion of said slide member.

17. The apparatus for mounting a disk drive of claim 16 wherein said slide member includes a front stop slot in which the front stop travels wherein contact between the front stop and a front end of the front stop slot restricts motion of said slide member toward a back end of said slide member, and contact between the front stop and the back end of the front stop slot restricts motion of said slide member toward the front end of said slide member.

18. The apparatus for mounting a disk drive of claim 1 wherein said slide member includes a back stop located near a back end of said slide member to restrict the sliding motion of said slide member.

19. The apparatus for mounting a disk drive of claim 18 wherein the back stop is formed from a part of said slide member that is bent out from another part of said slide member.

20. The apparatus for mounting a disk drive of claim 1 wherein said slide member includes a handle on a back end of the slide member, the handle being positioned to be grasped to move said slide member relative to said bracket.

21. An apparatus for mounting a disk drive to a chassis, the disk drive having a first side, a second side opposite the first side, a top side, and a bottom side opposite the top side, the apparatus comprising:
  a bracket having a first side, a second side opposite from the first side, a front end, a back end opposite from the front end, and an interior inside the sides and ends of said bracket and an exterior outside the sides and ends of said bracket wherein said bracket includes:
    a tongue with a connecting end, a side facing the interior of said bracket, and a side facing the exterior of said bracket, the tongue being coupled to said bracket at the connecting end of the tongue wherein the tongue:
      includes a first protrusion on the side facing the interior of said bracket, the first protrusion for engaging with the disk drive to secure the disk drive, and
      is part of the first side of said bracket,
    a fastener on a side of said bracket, the fastener being on the side of said bracket opposite from said slide member, the fastener for engaging the disk drive to secure the disk drive wherein the fastener includes a second protrusion extending into the interior of said bracket, the second protrusion for engaging with the disk drive to secure the disk drive,
    a support tab extending from a side of said bracket, the support tab for holding the disk drive to prevent movement of the disk drive substantially parallel with the side of said bracket from which the support tab extends wherein a first support tab is on the bottom side of the disk drive and a second support tab is on the top side of the disk drive,
    two retention tabs, each of the two retention tabs being located on opposite sides of said slide member from one another, the two retention tabs for slidably coupling said slide member to said bracket, and
    a front stop for restricting the sliding motion of said slide member; and
  a slide member slidably coupled to said bracket, said side member having a front end and a back end, said slide member for forcing a portion of said bracket against the disk drive to secure the disk drive in said bracket wherein said slide member includes:
    a front stop slot with a front end and a back end, the front stop slot forming an opening in which the front stop travels wherein contact between the front stop and the front end of the front stop slot restricts motion of said slide member toward the back end of said slide member, and contact between the front stop and the back end of the front stop slot restricts motion of said slide member toward the front end of said slide member,
    an opening into which the tongue extends when said slide member is moved toward its front end relative to said bracket and from which the tongue is expelled when said slide member is moved toward its back end relative to said bracket, the tongue being engaged with the disk drive when said slide member is moved toward its back end, and
    a back stop located near the back end of said slide member for restricting the sliding motion of said slide member wherein the back stop is formed from a portion of said slide member that is bent out from said slide member.

22. An apparatus for mounting a disk drive to a chassis, comprising:
  a bracket for supporting the disk drive in a first direction; and
  a slide member slidably coupled to said bracket such that sliding of said slide member in a second direction substantially perpendicular to the first direction causes a deformable portion of the bracket to engage the disk drive and at least restrict movement of the disk drive in the second direction and in a third direction opposite the second direction;
  wherein said slide member has a recess with an edge positioned to engage the deformable portion of the bracket and force the deformable portion against the disk drive, and wherein sliding of said slide member in the third direction releases restriction of the movement of the disk drive in the second direction and the third direction.

23. The apparatus for mounting a disk drive of claim 22 wherein said bracket supports the disk drive in the first direction and in a fourth direction opposite the first direction.

24. An apparatus for mounting a disk drive to a chassis, comprising:
  a bracket for supporting the disk drive in a first direction; and
  a slide member slidably coupled to said bracket such that sliding of said slide member in a second direction substantially perpendicular to the first direction causes the disk drive to be fixed in said bracket;
  wherein said slide member has a recess with an edge positioned to engage a deformable portion of the bracket and force the deformable portion against the disk drive, and wherein sliding of said slide member in a third direction opposite the second direction releases the fixed attachment of the disk drive from said bracket.

25. The apparatus for mounting a disk drive of claim 24 wherein said bracket supports the disk drive in the first direction and in a fourth direction opposite the first direction.

26. A computer system having an apparatus for mounting a disk drive, the system comprising:
  a chassis having a front;
  a power supply coupled to said chassis;
  a central processing unit coupled to said chassis and electrically connected to said power supply; and
  a disk drive electrically connected to said central processing unit, said disk drive including the apparatus for mounting said disk drive to said chassis, the apparatus comprising:
    a bracket coupled to said chassis, the bracket having a deformable element for engaging the disk drive; and
    a slide member slidably coupled to the bracket to move in a first direction relative to the bracket and a second direction opposite the first direction, the slide member having a recess with an edge positioned to engage the deformable element and force the deformable element against a side of the disk drive to secure the disk drive in the bracket when the slide member moves in the first direction, the recess receiving at least part of the deformable element when the slide member moves in the second direction.

27. The computer system of claim 26 further comprising a bezel coupled to the front of said chassis wherein sliding movement of the slide member is restricted by contact between the front end of the slide member and the bezel when the bezel is coupled to said chassis such that said disk drive remains secured in the bracket so long as the bezel is coupled to said chassis.

28. A method of mounting a disk drive to a chassis, comprising the acts of:

inserting a disk drive into a bracket that is coupled to a chassis; and sliding a slide member relative to the bracket to engage an edge of a recess of the slide member with a deformable element of the bracket and force the deformable element of the bracket against the disk drive to secure the disk drive in the bracket.

29. The method of mounting a disk drive of claim 28 wherein the act of sliding the slide member to force the deformably element of the bracket against the disk drive includes the act of forcing a tongue with a connecting end against the disk drive to secure the disk drive against the bracket, the tongue being coupled to the bracket at the connecting end.

30. The method of mounting a disk drive of claim 29 wherein forcing a tongue against the disk drive includes forcing a protrusion on the tongue into a hole in the disk drive.

31. A method of removing a disk drive from a chassis, comprising:

sliding a slide member relative to a bracket supporting the disk drive to release a deformable portion of the bracket from contact with the disk drive by receiving at least part of the deformable portion in a recess of the slide member as the deformable portion moves out of engagement with the disk drive; and removing the disk drive from the chassis.

32. The method of removing a disk drive from a chassis of claim 31 further comprising the removing a bezel from the chassis prior to sliding a slide member, the bezel being attached to the chassis and restricting sliding movement of the slide member by contact between the slide member and the bezel when the bezel is coupled to the chassis.

33. An apparatus for mounting a disk drive to a chassis, comprising:

a bracket having a deformable element for engaging the disk drive, the deformable element including a tongue with a connecting end, the tongue being coupled to said bracket at the connecting end of the tongue; and a slide member slidably coupled to said bracket, said slide member having a surface for forcing the deformable element against the disk drive to secure the disk drive in said bracket, and wherein said slide member includes an opening into which the tongue extends when said slide member is moved toward its front end relative to said bracket and from which the tongue is expelled by the surface when said slide member is moved toward its back end, the tongue being engaged with the disk drive when said slide member is moved toward its back end.

34. An apparatus for mounting a disk drive to a chassis, comprising:

a bracket having a deformable element for engaging the disk drive, the bracket further having a front stop; and a slide member slidably coupled to said bracket, said slide member having a surface for forcing the deformable element against the disk drive to secure the disk drive in said bracket, said slide member further having a front stop slot in which the front stop travels, wherein contact between the front stop and a front end of the front stop slot restricts motion of said slide member toward a back end of said slide member, and contact between the front stop and the back end of the front stop slot restricts motion of said slide member toward the front end of said slide member.

35. An apparatus for mounting a disk drive to a chassis, comprising:

a bracket having a deformable element for engaging the disk drive; and a slide member slidably coupled to said bracket, said slide member having a surface for forcing the deformable element against the disk drive to secure the disk drive in said bracket, said slide member further having a back stop located near a back end of said slide member for restricting the sliding motion of said slide member.

36. The apparatus of claim 35 wherein the backstop is formed from a part of said slide member that is bent out from another part of said slide member.

37. An apparatus for mounting a disk drive to a chassis, comprising:

a bracket having a deformable element for engaging the disk drive; and a slide member slidably coupled to said bracket, said slide member having a surface for forcing the deformable element against the disk drive to secure the disk drive in said bracket, said slide member further having a handle on a back end of the slider for grasping to move said slide member relative to said bracket.

* * * * *